Inventors.
R. Savy
G. R. Baker
W. E. Prescott
By: Marks & Clerk
Attys.

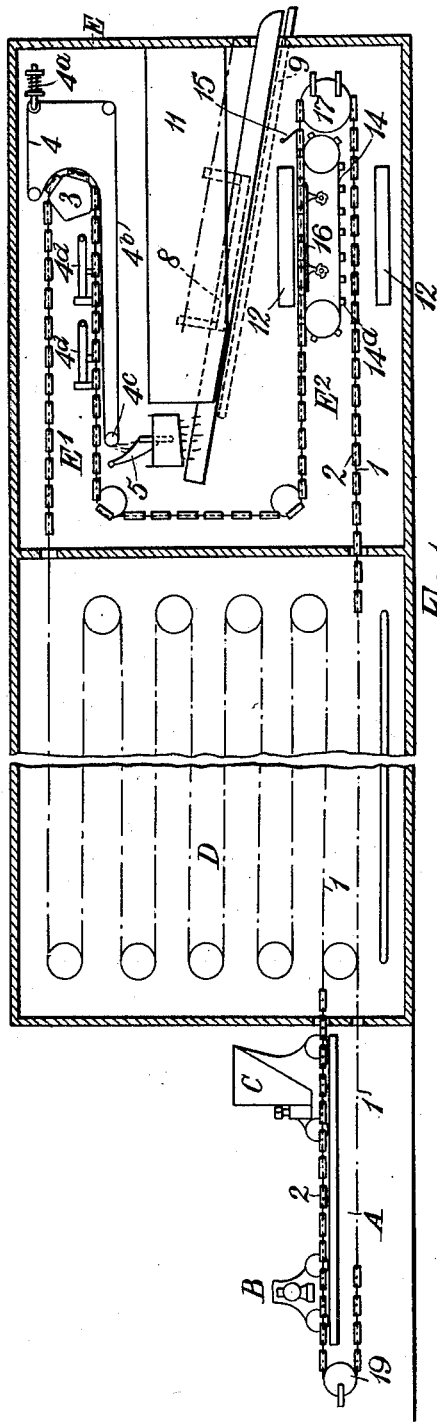
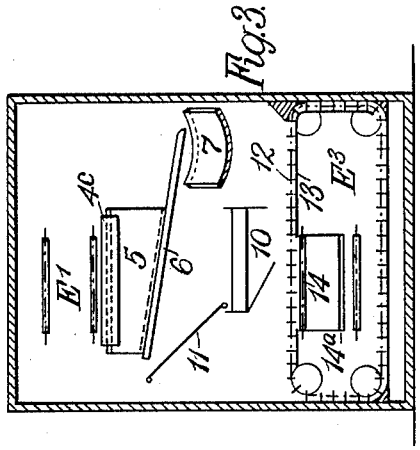
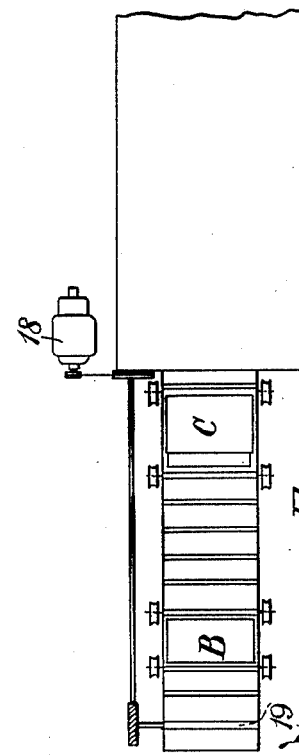

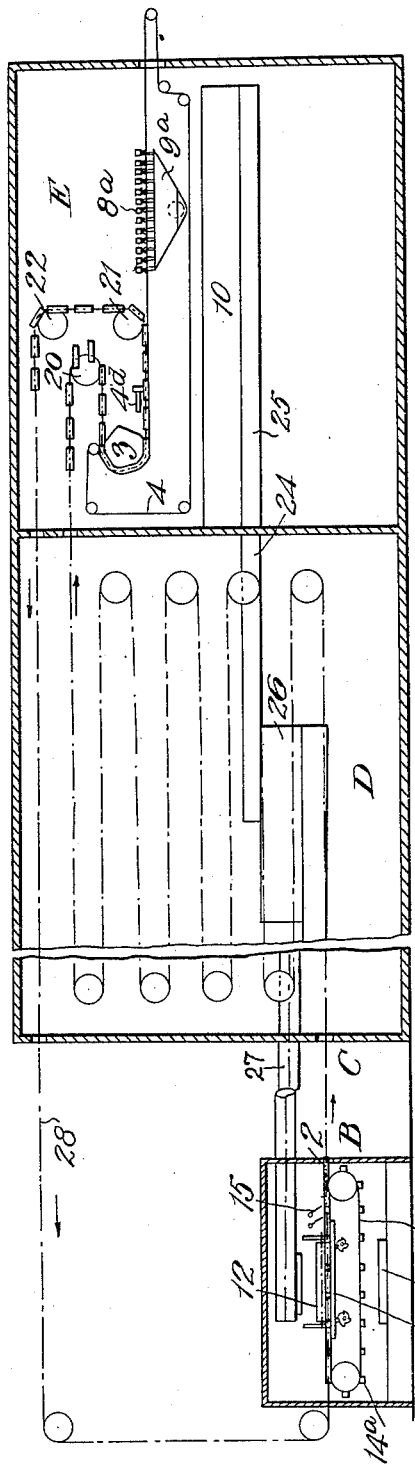
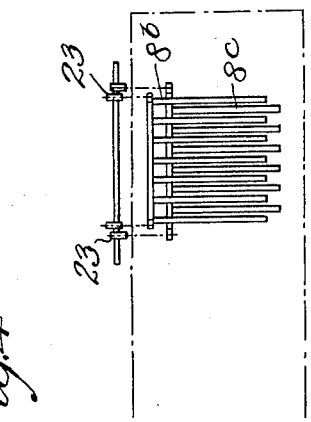
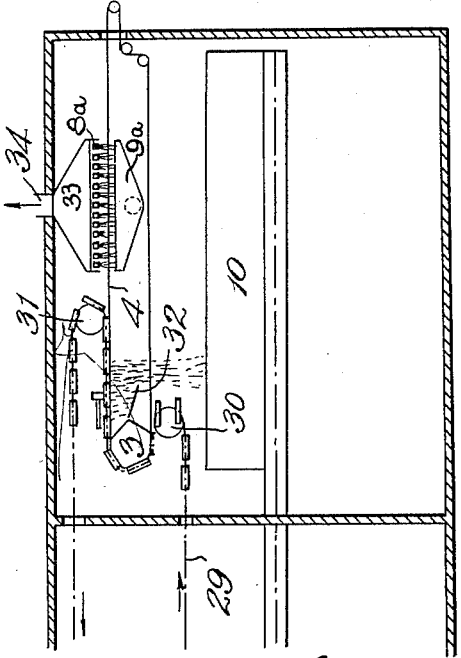

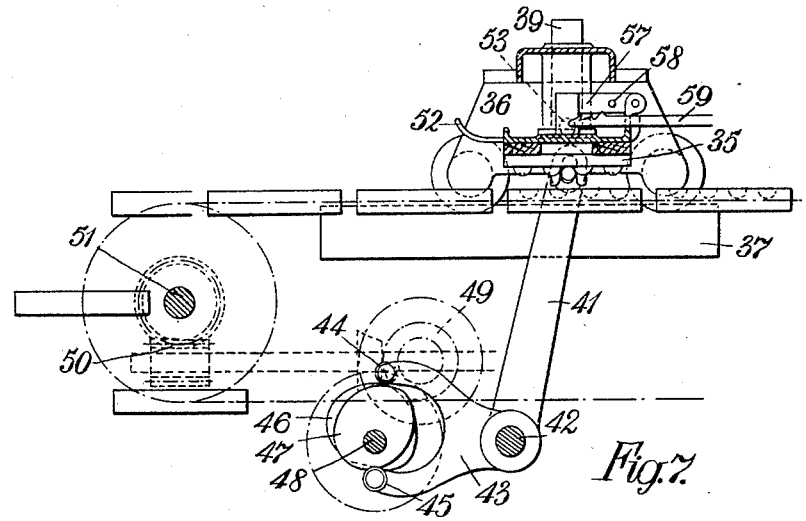
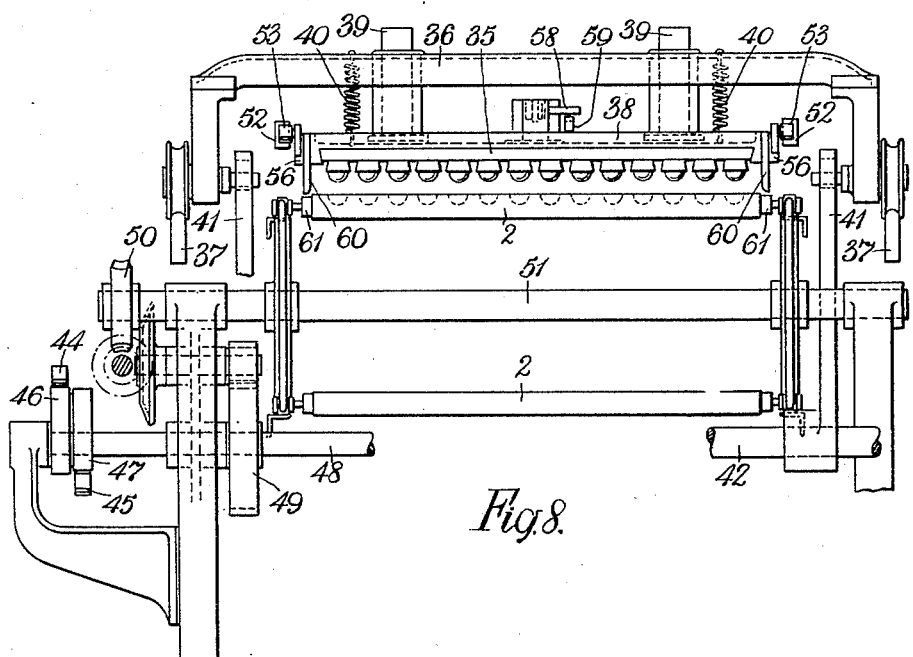

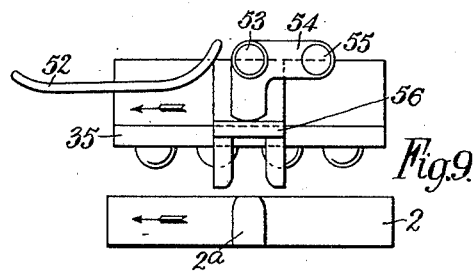
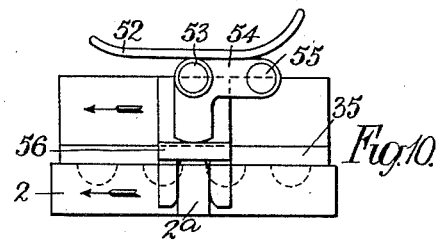
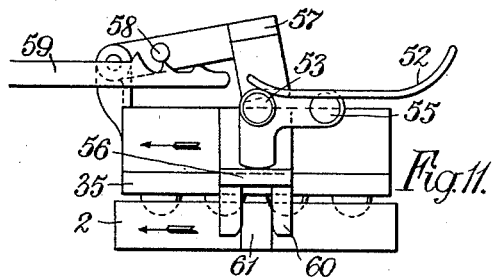
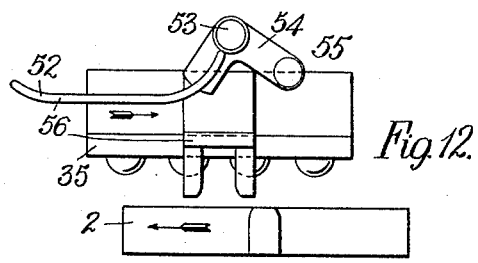

Patented Nov. 11, 1930

1,781,345

UNITED STATES PATENT OFFICE

ROBERT SAVY, OF COURBEVOIE, FRANCE, AND GEORGE RALPH BAKER AND WILLIAM EDWARD PRESCOTT, OF LONDON, ENGLAND, ASSIGNORS TO BAKER PERKINS COMPANY, INC., OF SAGINAW, MICHIGAN

PLANT FOR MOLDING CREAMS AND THE LIKE

Application filed May 29, 1928, Serial No. 281,476, and in Great Britain July 1, 1927.

This invention relates to the manufacture of sweetmeats, as for example creams, fondants, pastilles and the like (hereinafter referred to as "creams") such as are moulded or formed by the aid of starch or other moulds.

The object of the present invention is to provide an improved method of and means for the treatment of creams whereby the manufacturing operations or certain of them are carried on automatically in a progressive and continuous manner.

The improved method consists in causing the moulds to travel or pass from stage to stage in endless procession (continuously or intermittently) or in what may be termed a closed circuit, and carrying out various steps of the treatment (including the printing of the moulds, the depositing of the creams, passing the moulds through a drying chamber, dumping the contents of the mould trays, separating the creams and starch, preferably subjecting the starch to reconditioning treatment and refilling the moulds with starch and restarting the cycle) during transitional movement or during intermittent rest periods. Where moulds other than starch moulds are used, such as for example rubber moulds, the process comprises depositing the material (e. g. fondants) to be moulded, subjecting the fondants to treatment in a drying chamber, flexing or otherwise operating upon the moulds to dump the contents and returning the moulds to the depositing position, after cleaning, when such is desirable.

A feature of the invention lies in the provision of means adapted to print the moulds in the absence of relative transitional movement between the starch and the dies, as by accelerating the dies to the rate of travel of the moulds and maintaining a transitional movement of the dies equal to that of the mould trays during the printing operations.

The printing means may comprise a reciprocating mould carrier or a series or endless chain of mould carriers, one or more of which is or are operated for printing purposes in succession.

A further feature of the invention, applied to cases where the trays travel in spaced relationship, comprises the provision of means adapted to aid in the refilling of the trays with starch by temporary filling or closing up of the intervals between trays. According to one form distance pieces or blocks may be adapted progressively to mesh or otherwise enter or fill the intervals between the trays from the underside during the refilling process.

Other features of the invention concerned with the separation of the creams and sifting or cleaning operations will be referred to hereinafter.

In the accompanying drawings:—

Figure 1 is a diagrammatic side elevation of a plant according to one form of the invention for moulding creams in starch.

Figure 2 is a fragmentary plan view of the left-hand end thereof.

Figure 3 is a sectional view of the right-hand end of the plant seen in Figure 1, and Figure 4 is a similar view to Figure 1, of a modification and illustrating a form of starch reconditioning means.

Figure 5 is a diagrammatic detail plan of a brushing device for the creams.

Figure 6 is a fragmentary elevation of a further modification.

Figures 7 and 8 are, respectively, elevation (partly in section) and an end view, of one arrangement of a mould-printing machine according to the invention.

Figures 9 to 12 illustrate diagrammatically different operative positions of the mould-printing machine illustrated in Figures 7 and 8.

Figure 13:
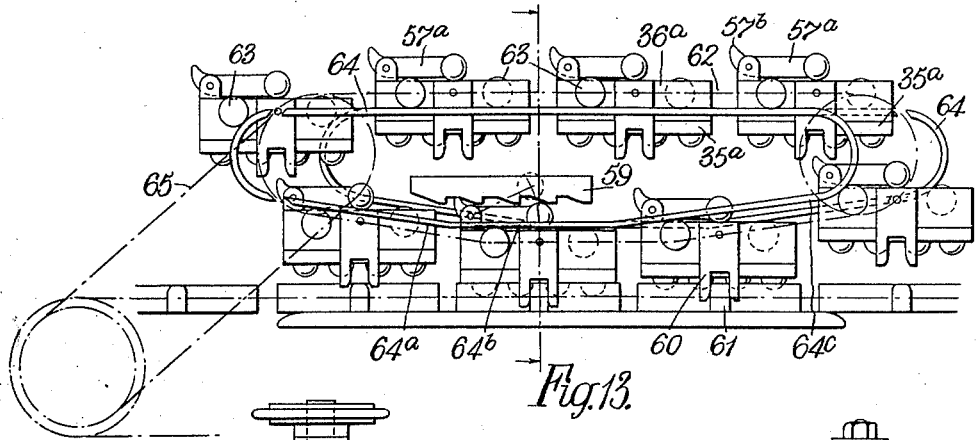
Figures 13, 14 and 15 are a side elevation, a sectional end view and a fragmentary plan, of a modified form of a mould-printing machine.

In carrying the invention into effect according to one convenient mode, by way of example, for a complete automatic and continuous process, a conveyor of the endless variety such as a chain conveyor 1 known in the art, is provided with means for supporting and conveying mould trays 2, or with carriages or trucks upon which mould trays may be temporarily mounted. This endless conveyor is provided with a longitudinal reach or portion A of an extent suitable to provide for the accommodation of printing and cream-depositing operations to be carried out (in the present example) while the trays are in motion. A machine for printing the starch moulds carried by the trays is seen at B and will be described hereinafter. After the starch in the trays 2 has been printed at B the trays pass under a cream-depositing machine C of known type adapted to charge each mould during the transit of the trays.

The conveyor passes into a drying or maturing chamber D where it is given an extended travel by guiding it in a tortuous or lap-and-lap path in order that the cream may be subjected to a suitable drying temperature and conditions for an adequate period. As the conveyor is given a tortuous path it is necessary to provide some means for maintaining the trays from being emptied or their contents spilled while the conveyor runs from one lap to another or passes round a guide roller or chain wheels through an angle. For this purpose known means may be provided for maintaining the trays horizontal while they are passing round a corner or from one lap to another. Or, alternatively, means may be provided whereby the trays are tilted slightly and projected at the turning point as described in British patent specification No. 293,725.

After leaving the drying chamber D the conveyor is caused to travel into or over a position whereat the contents of the trays may be emptied and the dried creams separated from the starch. The starch may be sifted and cleaned or otherwise reconditioned and passed to an appropriate position for refilling the trays.

The discharge of the trays, the separation of their contents and the recharging with starch, may be effected in a chamber or compartment, such as E. In this chamber means are provided for dumping the contents of the trays and such may consist of means adapted to cause the inversion of the trays consecutively when they reach a suitable point, or where special means are provided for maintaining their horizontal travel or tilting transfer in the drying chamber such means may be omitted or modified at the dumping position so that the trays are turned over in going from one lap to another or round a right-angled lower turn. The dumped contents of the trays are treated to a separating action so that the starch is removed by the aid of sieving or a brushing and sieving action while the creams are carried away to a suitable delivery.

According to one mode of discharging the trays (see Figure 1) the conveyor is guided in a pair of reaches or extensions $E^1$ and $E^2$. In the reach $E^1$ the conveyor trays are guided over a polygonal roller member 3 (such as described in British patent specification No. 305,517) the facets of which are of a suitable area to engage the backs of the trays or tray carriages and constitute a rotary support therefor. The upper surfaces of the trays as they pass round the roller 3 are engaged by an endless wire gauze belt 4 maintained in tension by a device such as $4^a$. This wire belt at the part adjacent or around the roller 3 acts as a temporary cover for the trays and holds the contents in position. The wire belt has an extension $4^b$ beneath the lap $E^1$ of the conveyor. This extension is sloped away from the conveyor so that as the trays travel round the roller 3 the contents is deposited upon the wire band and travels towards the end guide roller $4^c$.

In order to ensure that the trays empty themselves upon the conveyor $4^b$ knocking or tapping devices $4^d$ of any suitable kind may be provided.

The creams (and any of the starch not sifted through the wire mesh $4^b$) are discharged from the wire belt extension $4^b$ over the roller $4^c$ towards a guide plate 5 which directs the starch and creams on to a chute 6 which is formed as a sieve and may, if desired, be given a vibrational movement. The creams roll or slide down the inclined chute 6 into a delivery chute 7 in passing down which they may be cleansed by an oscillating or other brushing device 8. The chute 7 is preferably also made in the form of a sieve so that any of the starch which has not already separated from the creams is discharged on to a tailings chute 9.

The starch falling through the sieve chute 6 and from the wire belt $4^b$ is collected in a hopper 10 (Figure 3) to which it may be directed by aid of a shield or plate 11. The hopper is adapted to discharge into a starch box or receptacle $E^3$ formed in the bottom of the chamber E into which the bight or extension $E^2$ of the conveyor passes for the recharging of the trays with starch.

According to one convenient mode of recharging the trays the starch box is provided with a chain or band conveyor 12 provided with pushers or scrapers. This conveyor is guided in a path (such as seen in Figure 3) across the top of the trays where they pass under a gap in a plate or bed 13 which cooperates with the pushers or scrapers of the conveyor 12 to carry the starch from the bottom of the box up over the tray-conveyor.

As the trays are spaced one from another means are provided for filling in the interval between the trays while they are being filled with starch. These means comprise an endless canvas or like band 14 having a series of distance pieces or blocks 14a the size of which exactly corresponds with the interval between the trays 2 and the intervals between which correspond with the spacing intervals of the trays. The band 14 is passed round a pair of rollers and is driven or takes its drive from the tray-conveyor so that each of the blocks 14a meshes with a tray space. It is arranged that a suitable number of the intervals between the trays are filled in while the trays are passing beneath the starch-charging convyor 12. As the blocks 14a mesh with the tray intervals so that the surface of the blocks is flush with the surface of the trays, the scrapers pass over the trays and blocks laterally causing them to be chargd with starch and at the same time strickle the tops of the trays laterally. In addition to the lateral strickling device the starch charges may be strickled longitudinally by a strickling device (such as 15) suitably positioned.

If desired, as the trays are being charged they may pass over a vibrating table 16 adapted to settle and level the starch charges.

As the tray-conveyor leaves the starch-charging position it passes round a guide roller 17 where means are preferably provided for maintaining the trays horizontal. The charged trays are returned through or beneath the drying chamber D back to the position A of the chain conveyor where the cycle of operations is recommenced.

The conveyor may be driven by any suitable means from one or more points, for example an electric motor 18 may be adapted to drive the terminal roller 19, and it will be understood that the tray-conveyor, the drying chamber and other parts of the plant may be provided with ordinary appurtenances and ancillary parts for carrying out the process described.

According to a modification (see Figure 4) when the starch has been separated from the creams it may be reconditioned and then passed to a device adapted to recharge the trays which, if desired, instead of being located in the chamber E may be positioned in front of the printing and depositing positions (B and C, respectively). According to one form the conveyor passes from the drying chamber D over guide chains 20, polygonal roller 3 and guide rollers 21 and 22. The polygonal roller 3 operates in conjunction with a wire mesh endless band 4 such as already described in connection with Figure 1. This band is adapted to receive the starch and creams from the trays which may be provided with tapping devices 4d. The starch is sifted through the wire band 4 and falls into a collecting hopper 10 while the creams pass on to a brushing device 8a beneath which a hopper or inverted hood 9a is connected to an exhausting chamber for carrying away the starch dust or tailings.

The brushing device may comprise a pair of series of brushes 8b and 8c (Figure 5) carried in frames and adapted to be reciprocated by eccentric or other devices 23 driven by appropriate mechanism so that the brushes are alternately reciprocated with a brushing action upon the creams to remove adhering particles of starch.

The hopper 10 (Figure 4) is discharged through a conduit 24 in which may be located a screw or other conveyor the axis of which is represented at 25. This conveyor may discharge into a sifting box 26 from which the reconditioned starch may be conveyed by a screw-conveyor or other means through a conduit 27. The hopper 10 and conduits 24 and 27 may be heated by any suitable means and/or reconditioning heat may be acquired by the passage of the starch through the drying chamber D as indicated in Figure 4. The conduit 27 discharges into a starch conveyor and charging device 12 (similar to that already described in connection with Figure 3 and to which like reference numerals are applied). The charged trays as they pass towards the mould-printing position B may be operated upon longitudinally by stricklers 15.

It will be seen that in Figure 4 the tray-conveyor passes to the charging position through the upper portion of the drying chamber D by a lap 28. According to a modified arrangement instead of the conveyor passing in a downward direction around the roller 3 (as shown in Figures 1 and 4) the conveyor may emerge from the drying chamber D as at 29 (see Figure 6) passing round a chain wheel 30, the polygonal roller 3 and another chain wheel 31. In this case a wire mesh band 4 sifts the starch into the box 10, a deflecting plate 32 being provided to guard the chain wheel position 30. The creams are carried under the brushing device 8a. In connection with this brushing device or in connection with those already described, a hood 33 may be provided with a vent 34 or a connection to an exhausting device adapted to carry off starch dust which may be subsequently collected and returned to the plant. In addition the brushes may have beneath them an exhaust hopper 9a.

In order that the printing may take place while the trays are moving with the conveyor, the dies may be mounted upon swinging arms, slides, endless moving bands or belts or by other suitable means adapted to impart to the dies an acceleration and rate of travel so that they possess a transitional movement equal to that of the trays. When the speed of the dies and the speed of the trays are identical then automatic means come into operation to perform the known printing functions. The acceleration may be provided by suitable gear from the conveyor itself or by the engagement thereof with a part carried by mechanism associated with the dies.

In Figures 7 and 8 a printing machine according to the invention having a single reciprocating die plate is illustrated. The die plate is indicated at 35 carried by a suitable wheeled carriage 36 adapted to travel back and forth upon rails 37. The die plate 35 may be removably secured in a carrier 38 which is adapted to reciprocate vertically in the carriage 36 by the aid of guide posts 39 and is normally held in the elevated position by springs 40. The carriage is reciprocated back and forth by bell crank levers 41 pivoted on shaft 42 and having a bifurcated part 43 the arms of which carry rollers 44 and 45. These rollers are adapted to engage, respectively, cams 46 and 47, the cam 46 being adapted to cause the carriage to reciprocate from left to right while the cam 47 is adapted to return the carriage to its initial position. Cam 46 is designed and adapted to accelerate the carriage in moving it from left to right so that at a suitable point in its travel its rate of motion equals that of the tray with which the die plate 35 is adapted to cooperate. The cams may be mounted upon a shaft 48 driven through any suitable train of gears 49—50 conveniently from the chain wheel shaft 51. The die plate 35 is adapted to be depressed into printing contact with the starch in the tray by fixed cam plates 52 (carried by suitable supports) which are adapted to engage rollers 53 carried on bell crank levers 54 pivotally mounted upon the carrier 38 at 55. The bell crank levers are adapted to contact with lugs 56 on the carrier 38 for the die plates 35 when the levers are being depressed.

For the purpose of causing the die plates to be vibrated while they are being removed from the starch after printing, a tapping or knocking device 57 is pivotally mounted upon the carrier having a pin 58 adapted to run over a fixed toothed member 59 carried by an appropriate support.

In order to ensure a positive printing relationship between the dies and the moulds during the printing operation the carrier 38 is provided with depending slotted lugs 60 adapted to engage projections 61 formed upon the sides of the trays. As the dies are depressed the lugs 60 engage the projections 61 and maintain the dies in fixed relationship during the transference of the imprint of the dies to the starch and ensure a vertical imprint and retreating movement.

Figures 9 to 12 show the relative positions of the dies and moulds or trays during the motions before, during and after printing.

In Figure 9 the carriage 36 has been accelerated to the speed of travel of the trays 2 and the rollers 53 are about to engage the cams 52. The curved parts of the cams engage the rollers 53 and cause the dies to be depressed bringing the lugs 60 into engagement with the projections 61 thus registering the dies with the starch bed and maintaining the proper printing relationship while at the same time ensuring a true vertical movement during the critical operation. As the carriages pass forward the rollers 53 travel from under the cam plates 52 permitting the springs 40 to raise the dies from the printing starch moulds. The commencement of the raising operation is seen in Figure 11 and it will be noted that during this time the backs of the dies are tapped by the device 57 as the pin 58 travels over the toothed member 59.

Figure 12 shows the dies in the raised position after reversal of the carriage has taken place. The pivots 55 of the bell crank levers 54 permit the rollers 53 to clear the curved end of the cam plates 52 in regaining the initial position of the carriage on the return stroke.

Figure 15:
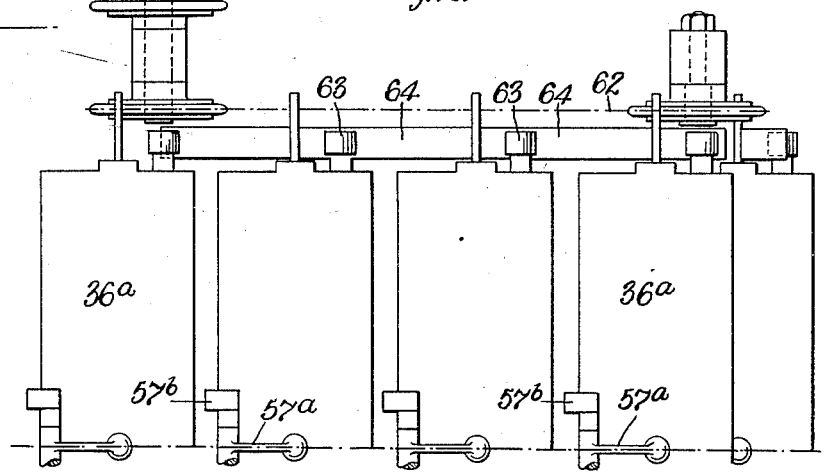
Figure 14:
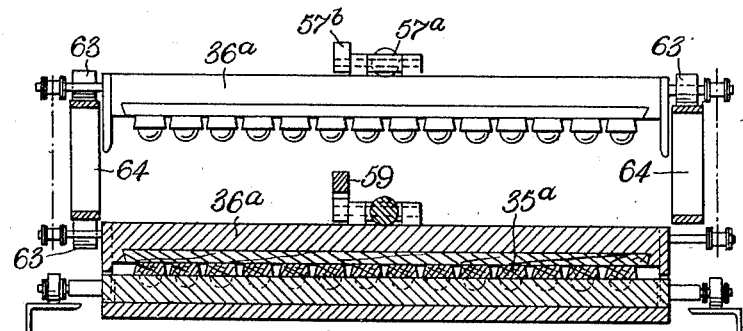

According to a modification printing may be effected by a plurality of dies mounted upon an endless travelling band or chain device, one, two or more of the dies being intended to engage in printing association with the starch at a time. According to this form (see Figures 13, 14 and 15) a pair of endless chains 62 supports a series of die-carriers 36$^a$ having die plates 35$^a$. These die-carriers have front and rear rollers 63 which travel on guiding rails 64 which are also adapted to operate as cam tracks for causing the depression and elevation of the die plates into and out of printing contact with the starch, and for maintaining their horizontal position while travelling round the ends of the cam tracks to guide them in circuit back to the initial position. The cam tracks are provided with portions 64$^a$, adapted to cause the depression of the die plates, flat portions 64$^b$ intended to maintain the printing contact for the desired period, and further inclined portions 64$^c$ for permitting the trays to be raised from the printing position. The carriers 36$^a$ are provided (as in the foregoing example) with slotted lugs 60 adapted to engage projections 61 for maintaining the proper printing association and the vertical movement of the dies. Each of the carriers may be provided with a rapping or tapping device 57$^a$ having heel pieces 57$^b$ which are adapted to engage a toothed rack device 59$^a$ during printing or as the dies rise from the printing position. The die chains 62 may be driven by any convenient means, such as 65, from the tray-conveyor chain wheel or other suitable source.

In carrying the invention into effect where the motion of the conveyor is intermittent instead of continuous throughout, means will be provided for giving the conveyor appropriate displacements alternating with periods of rest. During the periods of rest the printing and cream-depositing operations may be effected by known stationary printing and depositing means. The other operations of the conveyor may be carried out as described above, the only difference being that instead of the tray-conveyor moving continuously it has an intermittent motion.

Having now described our invention, what we claim as new and desire to secure by Letters Patent is:—

1. A plant for printing moulds whilst in motion comprising a reciprocating carriage, dies mounted on said carriage, means for accelerating the carriage to a speed of the moulds, a fixed cam device for causing the depression of dies into the printing contact, means for raising the dies and means for returning the dies to their initial position.

2. A plant for printing moulds whilst in motion comprising a reciprocating carriage, dies mounted on said carriage, lever means for accelerating the carriage to the speed of the moulds, a fixed cam device for causing the depression of dies into printing contact, resilient means for raising the dies and means for returning the dies to their initial position.

3. A plant for printing moulds whilst in motion comprising mould-carriers, and a reciprocating carriage having means for accelerating the carriage to the speed of the moulds, die plate mounted on said carriage, printing dies supported by said plate, a fixed cam device for causing depression of the dies into printing contact, registration means upon the die-carriers and upon the mould-carriers, so that the printing association of the dies and moulds is preserved during the printing operation, means for raising the dies and means for returning the dies to their initial position.

4. A plant for manufacturing creams by the aid of starch moulds into which the cream is deposited, comprising an endless conveyor adapted for continuous travel, a plurality of mould trays secured to the conveyor, a starch printing device comprising dies beneath which the mould trays travel, means for imparting transitional movement to the dies at the same speed as that of the moulds during the printing operation, a tray inverting device for inverting the trays to deliver the starch and creams to a separating device, and tray filling means whereat passing trays are continuously recharged with starch.

5. A plant for manufacturing creams as claimed in claim 4, wherein the mould trays are secured upon the conveyor in spaced relation, and an endless band having spaced slats secured thereto adapted to mesh with and close the spaces between the mould trays while the latter pass under the starch filling device.

6. A plant for manufacturing creams as claimed in claim 4 wherein the dies are mounted upon a reciprocating carriage, means for accelerating the carriage to the speed of travel of the mould trays and returning the carriage after the printing operation, a fixed cam device and an abutment associated with the die carriages adapted to engage the cam to cause depression of the dies into printing contact.

7. A plant for manufacturing creams as claimed in claim 4 wherein the dies are mounted upon a reciprocating carriage, means for accelerating the carriage to the speed of travel of the mould trays and returning the carriage after the printing operation, a fixed cam device, an abutment associated with the carriage adapted to engage the cam to cause depression of the dies into printing contact, and interengaging means upon the die member and upon the mould trays adapted to prevent relative transitional movement during the printing operation.

8. In plant for manufacturing creams as claimed in claim 4 a die plate mounted for vertical relative movement upon a reciprocating carriage, a bell crank lever one arm of which is connected to the carriage, a pair of rotary cams engaging the other arm, a driving connection between the rotary cams and the tray conveyor, a fixed cam, a roller on the die plate adapted to engage the cam to cause depression of the die plate into printing contact, and interengaging means upon the die plate and the mould trays adapted to prevent relative transitional movement during the printing operation.

9. In a plant for manufacturing creams as claimed in claim 4, a reciprocating carriage, a die plate mounted on said carriage and adapted for vertical movement relatively thereto, a bell crank lever one arm of which is connected to the carriage, a pair of rotary cams engaging the other arm, and adapted to cause back and forth movements of the carriage, a fixed cam, an abutment on the die plate, a lever pivotally mounted on the die plate and adapted to engage the abutment, a roller carried by said lever and adapted to engage the fixed cam to cause depression of the die plate into printing contact, a pair of fingers on the die plate and projections on the mould trays adapted to be engaged by said fingers to prevent relative transitional movement during the printing operation and ensure vertical depression and raising of the dies in commencing and terminating the printing operation.

10. In a plant for manufacturing creams as claimed in claim 4 interengaging means on the printing device and the mould trays for preventing relative transitional movement during the printing operation.

11. In a plant for manufacturing creams as claimed in claim 4 interengaging means on the printing device and the mould trays, adapted to ensure the vertical depression and raising of the printing device in commencing and terminating the printing operation.

12. A plant for manufacturing creams as claimed in claim 4, wherein the mould trays are secured upon the conveyor in spaced relation, characterised by means of temporarily blocking said spaces while the moulds are being filled with starch.

In testimony whereof we have signed our names to this specification.

ROBERT SAVY.
GEORGE RALPH BAKER.
WILLIAM EDWARD PRESCOTT.